(12) United States Patent
Herron et al.

(10) Patent No.: US 8,291,687 B2
(45) Date of Patent: *Oct. 23, 2012

(54) CONTINUOUS ROUND BALER

(75) Inventors: Maynard M. Herron, Hesston, KS (US); Robert A. Matousek, Milan, IL (US); Cedric J. Blough, Moundridge, KS (US); Patrick Kendrick, Hesston, KS (US); Brian D. Olander, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/645,576

(22) Filed: Dec. 23, 2009

(65) Prior Publication Data
US 2011/0023441 A1 Feb. 3, 2011

Related U.S. Application Data

(60) Provisional application No. 61/230,381, filed on Jul. 31, 2009.

(51) Int. Cl.
A01D 75/00 (2006.01)
(52) U.S. Cl. ........................................................ 56/341
(58) Field of Classification Search ............ 56/341–343; 100/87–89; 198/806, 807; 474/123; 460/112
See application file for complete search history.

(56) References Cited

U.S. PATENT DOCUMENTS

| | | | |
|---|---|---|---|
| 3,926,319 A * | 12/1975 | Neely, Jr. ................... 414/789.7 |
| 4,057,954 A | 11/1977 | Mast |
| 4,077,315 A | 3/1978 | Meiers |
| 4,092,914 A * | 6/1978 | Burrough et al. ................ 100/88 |
| 4,319,446 A | 3/1982 | Arnold et al. |
| 4,510,861 A | 4/1985 | Campbell et al. |
| 4,514,969 A | 5/1985 | Moosbrucker et al. |
| 4,656,812 A | 4/1987 | Busse et al. |
| 4,686,812 A | 8/1987 | Bruer et al. |
| 4,914,900 A | 4/1990 | Viaud |
| 5,115,734 A | 5/1992 | Quartaert |
| 5,165,333 A | 11/1992 | Ratzlaff et al. |
| 5,557,859 A | 9/1996 | Baron |
| 5,752,374 A | 5/1998 | Allworden et al. |
| 5,768,872 A * | 6/1998 | Von Allworden ............... 56/341 |
| 5,979,153 A * | 11/1999 | Roth ............................... 56/341 |
| 6,032,446 A | 3/2000 | Gola et al. |
| 6,161,368 A * | 12/2000 | Wilkens et al. ................. 56/341 |
| 6,263,650 B1 | 7/2001 | Deutsch et al. |
| 6,272,825 B1 | 8/2001 | Anderson et al. |
| 6,421,992 B1 | 7/2002 | Goering et al. |

(Continued)

FOREIGN PATENT DOCUMENTS

DE 3248066 A1 6/1984

(Continued)

OTHER PUBLICATIONS

International Search Report for International Application No. PCT/IB2010/001788 Dated Jan. 24, 2011.

(Continued)

*Primary Examiner* — Robert Pezzuto

(57) ABSTRACT

In an example embodiment, a continuous baler includes a round baler and an adjustable conveyor for providing crop to the round baler. The adjustable conveyor may include a conveyor belt and a controller for manipulating the conveyor belts. In one example embodiment, the speed of the conveyor is adjusted in accordance with the operation of the baler.

16 Claims, 8 Drawing Sheets

U.S. PATENT DOCUMENTS

| | | | |
|---|---|---|---|
| 6,467,237 B2 | 10/2002 | Viaud | |
| 6,622,455 B2 | 9/2003 | Davis et al. | |
| 6,644,006 B1 * | 11/2003 | Merritt et al. | 56/341 |
| 6,675,561 B2 | 1/2004 | Davis et al. | |
| 6,692,351 B2 | 2/2004 | Johnson et al. | |
| 6,729,118 B2 | 5/2004 | Viaud | |
| 6,874,311 B2 | 4/2005 | Lucand et al. | |
| 7,051,651 B2 | 5/2006 | McDowell | |
| 7,261,633 B2 | 8/2007 | Benes | |
| 7,337,713 B1 | 3/2008 | Olander et al. | |
| 7,409,814 B2 | 8/2008 | Hood et al. | |
| 7,448,196 B2 | 11/2008 | Schrag et al. | |
| 7,485,035 B1 | 2/2009 | Yde | |
| 7,553,225 B2 | 6/2009 | Benes | |
| 7,818,954 B2 * | 10/2010 | Rempe et al. | 56/341 |
| 7,937,923 B2 * | 5/2011 | Biziorek | 56/341 |
| 2001/0013214 A1 | 8/2001 | Viaud | |
| 2005/0198934 A1 | 9/2005 | Johnson | |
| 2005/0198935 A1 | 9/2005 | Johnson | |
| 2006/0048481 A1 | 3/2006 | Hood et al. | |
| 2007/0175198 A1 | 8/2007 | Viaud et al. | |
| 2008/0141639 A1 | 6/2008 | Shields | |
| 2008/0224445 A1 | 9/2008 | Viaud et al. | |
| 2008/0248843 A1 | 10/2008 | Birrell et al. | |
| 2008/0271428 A1 | 11/2008 | Rempe et al. | |
| 2009/0017885 A1 | 1/2009 | Halls | |
| 2009/0019826 A1 | 1/2009 | Rigney | |
| 2009/0042625 A1 | 2/2009 | Dow et al. | |
| 2009/0043686 A1 | 2/2009 | Matsumoto | |
| 2009/0044710 A1 | 2/2009 | Eylenbosch | |
| 2009/0049817 A1 | 2/2009 | Viaud | |
| 2009/0095662 A1 | 4/2009 | Redekop et al. | |
| 2009/0104952 A1 | 4/2009 | Redekop et al. | |
| 2009/0124309 A1 | 5/2009 | Redekop et al. | |

FOREIGN PATENT DOCUMENTS

| | | |
|---|---|---|
| DE | 19932336 A1 | 1/2001 |
| EP | 2042028 A1 | 2/2009 |
| EP | 2036426 A2 | 3/2009 |
| EP | 2196082 A1 | 6/2010 |
| FR | 2877807 A1 | 5/2006 |
| GB | 2003716 A | 3/1979 |
| GB | 2324498 A | 10/1998 |
| JP | 20080011804 A | 1/2008 |

OTHER PUBLICATIONS

International Search Report for International Application No. PCT/IB2010/001799 Dated Jan. 14, 2011.

International Search Report for International Application No. PCT/IB2010/001786 Dated Dec. 29, 2010.

* cited by examiner

CONTINUOUS ROUND BALER

CROSS REFERENCE TO RELATED APPLICATIONS

This application claims priority to U.S. Provisional Application No. 61/230,381, entitled "Combine Harvester and Baler For Biomass Collection," filed Jul. 31, 2009 which is incorporated by reference herein. This application is related to U.S. Non-Provisional patent application Ser. No. 12/645,631 entitled "Continuous Round Baler With Pickup" and U.S. patent application Ser. No. 12/645,595 entitled "Round Baler With Variable Speed Baling Mechanism" both of which are entirely incorporated by reference herein.

BACKGROUND

Conventional round balers receive crop and form it into compacted bales in a bale forming chamber. There are generally three major cycles in the operation of a round baler: a bale-forming cycle, a bale-wrapping cycle, and a bale-ejecting cycle. A round baler is typically powered and towed by a tractor. A crop pickup picks up material lying on the ground and feeds it to the bale forming belts of the baler to form a bale.

Once the bale forming cycle is complete and the bale fully formed, the towing vehicle may stop and a bale wrapping cycle may begin. For example, once a bale reaches a desired size and/or shape, the operator stops the forward motion and stops providing crop to the baler so that a baler can perform wrapping operations. With the forward motion of the baler stopped, mesh or twine is wrapped around the bale using an automated mechanism associated with the bale chamber.

Once wrapping is complete, a bale ejecting cycle may begin in which the bale chamber is opened, typically by lifting a tailgate, and the wrapped bale falls or is pushed out of the bale chamber. After ejection, the bale forming cycle is restarted for a new bale and the operator once again provides crop to the baler and moves the baler through the field.

DESCRIPTION OF EXAMPLE EMBODIMENTS

Overview

Figure 1:
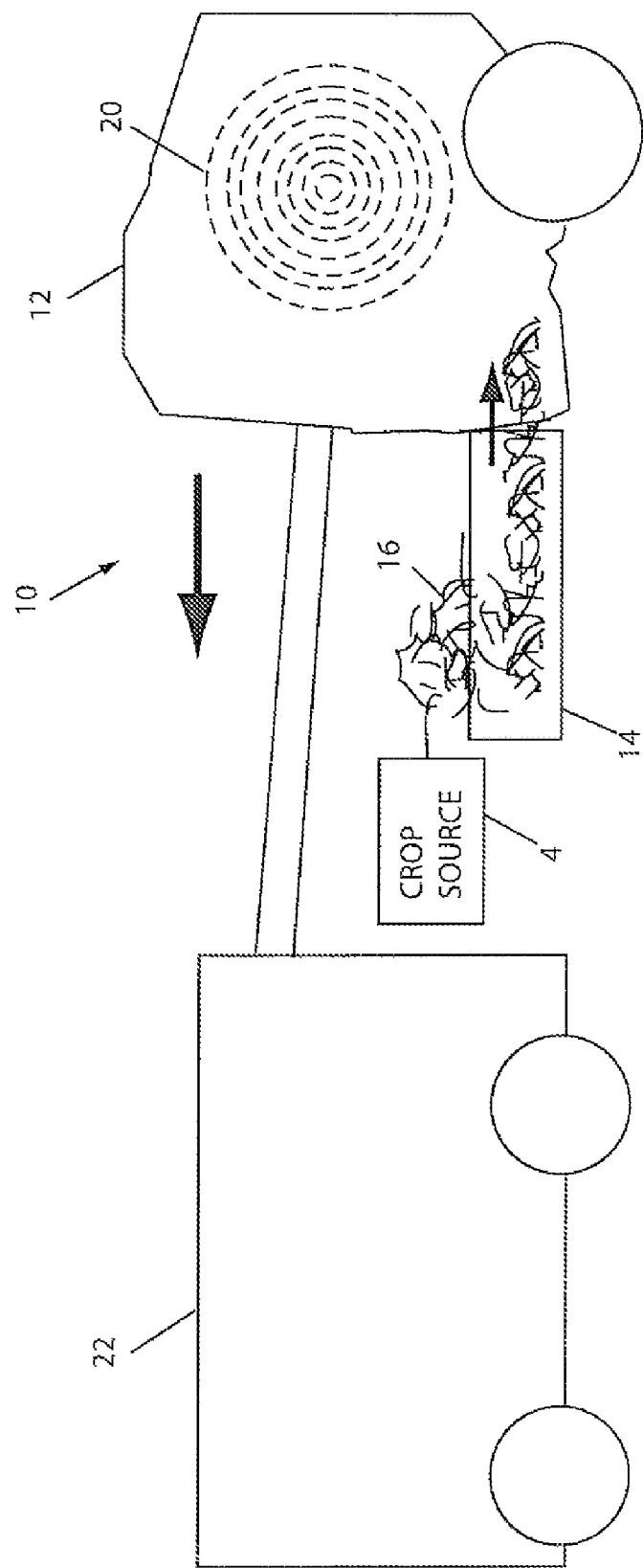
FIG. 1 shows a schematic of an example embodiment of a continuous baler.

In an example embodiment, a continuous baler receives crop material from a crop source and bales the crop material into bales. The term "continuous" refers to the receiving of crop by the continuous baler as the baler forms the bales. For example, a baler may be pulled through a field without stopping as crop material is gathered and the baler progresses through its operational cycles. This eliminates the stoppage of the baler's movement through the field and the stoppage of the receipt of crop material that occurs under traditional methods as the baler performs various operations in which it does not receive the crop material, such as during a bale ejection cycle. The term "crop material" is intended to include grain and material other than grain (MOG), such as residue from a combine. For example, the continuous baler may be used for baling hay or biomass material such as corn cobs or the like. This arrangement provides several advantages over prior art systems, including the ability to continually move the baler through the field and collect crop material during the various operational cycles of the baler. An adjustable crop conveyor system can be used to accumulate crop material and provide crop material to the baler in accordance with various operational cycles of the baler.

In one example embodiment, an adjustable speed conveyor system comprises an adjustable crop conveyor for receiving crop material from a crop source and providing the crop material to a baler, and a controller for manipulating the speed of the adjustable speed conveyor. In one example embodiment, the crop source is a combine that provides crop material to the adjustable crop conveyor. A user interface may also be provided for receiving operating instructions from an operator of the continuous baler and for controlling certain functions of the baler and the adjustable crop conveyor in accordance with the operating instructions. For example, a controller may vary the speed of the conveyor in accordance with predetermined schemes provided by the operator via the user interface. In one example embodiment, the user interface may be used to direct the adjustable crop conveyor in accordance with a scheme in which the conveyor speed is changed in accordance with the different operational cycles of the baler. For example, the conveyor may be stopped, started, sped up, slowed down and/or reversed in accordance with the different operational cycles of the baler.

In an example embodiment, the adjustable crop conveyor may comprise one or more conveyor belts rotatably mounted on rolls, such as a drive roll and an idler roll. The drive roll may be powered by a hydraulic motor that may be manipulated by the controller and various solenoid and flow control valves to vary the speed and direction of the drive roll and thus the speed and direction of movement of the conveyor belts and thereby manipulate the supply of crop material that is provided to the conveyor from the crop source, to the baler. A forward or feed end of the conveyor may be positioned adjacent the crop source to receive crop material thereon. A rear or outlet end may be positioned adjacent an inlet of the baler so that the crop material received from the crop source may be conveyed by the conveyor from the feed end into the baler for baling. In an example embodiment, the feed end is positioned to receive crop material from the outlet of a combine and the outlet end of the conveyor is positioned adjacent a feeder of the baler. While the example embodiments are discussed in the context of a belt conveyor, one of skill in the art will recognize that other conveyor arrangements may be used, such as an auger conveyor or chain conveyor as known in the art, and the term "conveyor" is intended to incorporate these alternative arrangements.

One example method of providing crop material to a baler comprises: continuously receiving crop material at an adjustable speed crop conveyor configured to provide the crop material to a baler; determining an operational cycle of the baler; and manipulating movement of the conveyor in accordance with the operation of the baler to provide the crop material to the baler. Another example method of providing crop material to a baler comprises: continuously receiving crop material on a crop conveyor from a crop source; running the crop conveyor to transport the crop material to a baler during a bale forming cycle of the baler; stopping the conveyor during a wrapping cycle of the baler; and running the crop conveyor after ejection of the bale from the baler. In example embodiments, the conveyor may be run at a first speed to transport the crop material to the baler during a bale forming cycle of the baler until the bale reaches a first bale size; and running the conveyor at a second speed during the bale forming cycle of the baler to transport the crop material received from the crop source to the baler until the bale reaches a second bale size.

An example method of baling crop material comprises: continuously providing crop material to a crop conveyor, the crop conveyor configured to provide the crop material to a baler; determining an operational cycle of a baler; and manipulating the movement of the crop conveyor in response to the operational cycle of the baler. Another example method for baling crop material, comprises: continuously receiving crop material on a crop conveyor from a crop source; running the crop conveyor to provide the crop material to the baler; receiving at a baler the crop material from the crop conveyor and forming a bale; stopping the conveyor; wrapping the bale; ejecting the bale from the baler; and restarting the conveyor to provide crop material to the baler. It should be noted crop material may be continuously provided to the conveyor during the various operational cycles of the baler, whether the crop is then provided to the baler by the conveyor, thereby allowing the baler and the equipment moving the baler to move continuously over the field and the crop material to accumulate on the conveyor. In the example method, the crop conveyor may be run at a first speed to provide the crop material to the baler until the baler forms a bale of a first size in the baler; and after the bale reaches the first size, running the conveyor at second speed.

DETAILED DESCRIPTION

As required, example embodiments of the present invention are disclosed herein. The various embodiments are meant to be non-limiting examples of various ways of implementing the invention and it will be understood that the invention may be embodied in alternative forms. The present invention will be described more fully hereinafter with reference to the accompanying drawings in which like numerals represent like elements throughout the several figures, and in which example embodiments are shown. The figures are not necessarily to scale and some features may be exaggerated or minimized to show details of particular elements, while related elements may have been eliminated to prevent obscuring novel aspects. The specific structural and functional details disclosed herein should not be interpreted as limiting, but merely as a basis for the claims and as a representative basis for teaching one skilled in the art to variously employ the present invention.

Turning to the figures, FIG. 1 shows a schematic of a continuous baler 10 that includes a baler 12 and an adjustable conveyor 14 for receiving crop material 16 from a crop source 18, and providing the crop material 16 to the baler 12 (as shown by small arrow) for forming into a bale 20. A vehicle 22, such as a tractor or combine, may be used to pull the baler 12 through a field as indicated by the large arrow in FIG. 1.

Figure 2:
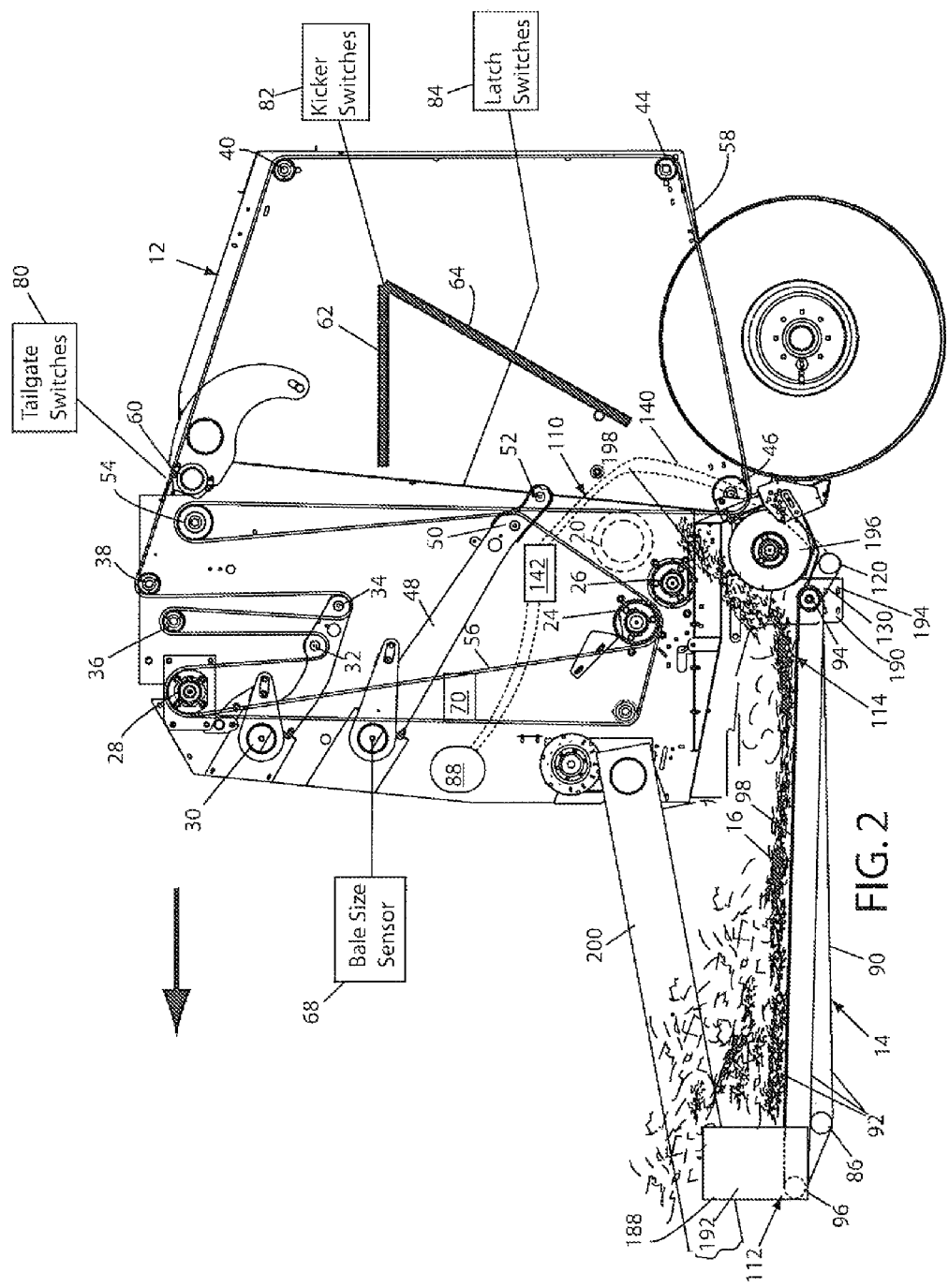
FIG. 2 shows an example embodiment of a continuous baler comprising a round baler and an adjustable crop conveyor.

As shown in FIG. 2, the adjustable conveyor 14 may be incorporated as part of a round baler 12 such as the 5500 and 900 series round balers manufactured by Agco Corporation including the Hesston 5545, 5556, 5556A, and 5546 round balers; however, the invention may be incorporated as a part of other types of baling equipment such as fixed chamber balers, etc. Other details of round balers which may be used with the present invention are described in U.S. Pat. Nos. 7,3376,713; 6,477,824; 6,675,561; 4,850,271; and 4,524,867 all incorporated in their entirety into the present application by reference. As seen in the example embodiment shown in FIG. 2, the round baler 12 may include a lower drive roll 24 and a starting roll 26. Above the lower drive roll is an upper drive roll 28. Pivotally mounted within the baler is a belt tension arm 30 to which are pivotally mounted the front belt tension roll 32 and the rear belt tension roll 34. At the top of the front portion of the bale chamber is a front upper idler roll 36 and a rear upper idler roll 38. Following the interior of the baler wall around clockwise, there is a tailgate belt roll 40 a lower rear tailgate roll 44, and front lower idler roll 46. A bale density arm 48 is pivotally mounted within the baler and has a front bale density roll 50 and a rear bale density roll 52, both pivotally mounted on the distal end from the pivotal mounting of the bale density arm 48. Near the top of the bale chamber above the bale density rolls is depicted an upper bale chamber roll 54. A plurality of bale forming belts 56 (one shown in profile) are threaded around each of the above identified rolls as depicted in FIG. 2. The bale forming belts are tensioned by the front and rear belt tension rolls 32, 34, mounted on the belt tension arm 30 and the rolls 50, 52 mounted on the bale density arm 48.

The example baler includes a tailgate 58 that opens and closes around pivot point 60. A bale kicker assembly 62 (shown schematically) is associated with the tailgate. The bale kicker assembly includes the bale push bar 64 (depicted in its home position) and two hydraulic cylinders (not shown). The bale kicker is used to prevent contact between the tailgate 58 and the bale when the tailgate is closing. After the tailgate rises, hydraulic pressure is applied to the base end of the kicker hydraulic cylinders. The bale push bar 64 rises upward and rearward pushing the bale away from the tailgate before the tailgate closes. After the tailgate is closed the kicker is returned to its home position.

A baler control system may include a controller 70 positioned on or near the round baler 12 and a user interface 500 (FIG. 5) preferably positioned on the tow vehicle 22, such as a tractor, combine, towing the baler 12. The controller 70 may receive data from a variety of different sensors and in response issue commands to effect various operations of the baler and/or the adjustable conveyor 14. Although the controller 70 and the user interface 500 are preferably separate components, their functions could also be combined into a single unit positioned either on the baler 12 or its towing vehicle 22. The baler controller 70 may be used to control the operation of the baler 12, including its various operational cycles, such as the bale forming, bale wrapping, and bale ejecting cycles, and the adjustable crop conveyor 14. For example, a bale size sensor 68 (shown schematically) may determine the bale size of the bale 20 in the baling chamber and provide a corresponding signal to the controller 70 and the user interface 500. The controller 70 may then determine the desired operational cycle for the baler 12 and the desired operation of the adjustable conveyor 14.

The bale size sensor 68 may be provided on the density arm 48 and detect the angular position of the bale density arm and send signals to the electronic control system to indicate the bale size during the bale forming cycle. In addition, the baler can includes tailgate switches 80 (shown schematically) that detect the position of the tailgate whether opened or closed, kicker switches 82 (shown schematically) that detect the position of the kicker whether out or home, and latch switches 84 (shown schematically) that detect whether the tailgate is latched. The tailgate and kicker switches cause signals to be sent to the controller 70 indicating the status of the elements to which they are connected.

In addition to the elements described above, the baler 12 can include a hydraulic pump 88 and a clutch assembly and control electronics, neither of which is shown in FIG. 2 but which are necessary for operation of the baler as will be understood by one of ordinary skill in the art.

In the example embodiment shown in FIG. 2, the adjustable conveyor 14 for use with the round baler 12 can include a conveyor 90 having a plurality of endless belts 92 that are wrapped around rolls 94, 96 for movement. The top surface 98 of the conveyor belts 92 define a movable accumulating and conveying surface for receiving and conveying crop material 16 provided to the conveyor from a crop source to an inlet 198 of the baler 12. The conveyor belts 92 may be arranged so that the conveyor belts 92 extend from a forward or receiving end 112 located adjacent the crop source to a rear or output end 114 adjacent an inlet 198 of the baler 12.

The belts 92 may be driven by a drive roll 94 whose rotation results in movement of the belts 92. The drive roll 94 may in turn be powered by a hydraulic motor 120. For example, fluid may be provided to the hydraulic motor 120 from a hydraulic pump 88 and manipulated by solenoids and/or flow control valves to vary the fluid flow to vary the speed of the motor 120. The drive roll 94 may be coupled to the motor 120 by a chain 130 or other means as known in the art so that by varying the speed of the motor 120 varies the rotation of the drive roll 94 and the conveyor belts 92 powered by the drive roll 94.

This arrangement allows the movement of the conveyor belts 92 to be controlled by the controller 70. In an example embodiment, the hydraulic pump 88 may be mounted in the baler and powered by a takeoff mechanism of the vehicle 22. Hydraulic lines 140 may extend to a manifold 142 mounted in the baler 12 and be coupled to solenoids and/or flow control valves that respond to command signals sent from a controller 70 to manipulate hydraulic fluid provided to the motor 120. In an example embodiment, an "on" solenoid valve 150, an "off" solenoid valve 152, and a flow control valve 154 (all shown schematically in FIG. 4) may be communicatively coupled to the controller 70 and used to control the hydraulic motor 120 and thus the movement of the conveyor belts 92. The controller 70 may also manipulate other components of the baler 12 related to the baler's various operating cycles. It should be noted that while a single controller 70 is shown as controlling both the conveyor system adjustable conveyor 14 and the baler's operational cycles, multiple controllers could be used to accomplish the same tasks.

As discussed in more detail below, the conveyor 90 may be manipulated by the controller 70 in accordance with predetermined schemes programmed by an operator. For example, the conveyor 90 may be driven at different speeds in conjunction with the different operation cycles of the baler 12. For example, the conveyor belts 92 may be driven at a first speed during a bale forming cycle of the baler 12 and a second speed or stopped during the wrapping and/or ejection cycles of the baler 12 to allow crop material to accumulate on the conveyor belts 92. This allows for the continuous movement of the baler 12 through the field as crop material 16 may continually be received from the combine 22 or other crop source and accumulated on the conveyor 90 during baler operational cycles in which the conveyor 90 does not convey crop material 16 into the baler 12. The accumulated crop material 16 can then be fed into the baler 12 during an appropriate operational cycle, such as a bale forming cycle.

The belts 92 may comprise a plurality of parallel spaced endless belts wrapped around the rolls 94, 96. Other arrangements could be used such as a single belt of greater width. In the example embodiments, the belts 92 may be staggered such that every other belt engages a lower idler roll 86. This arrangement creates gaps between the portions of the belts extending below the rolls 94, 96 to allow crop material 16 that falls into the gap between the conveyor belts 92 to pass to the ground.

To couple the adjustable conveyor 90 to the baler, front mount assemblies 188 and rear mount assemblies 190 (only one of each shown in FIG. 2) may be provided. The mount assemblies may include mounting plates 192, 194 that couple the conveyor 90 to the tongue 200 and the baler 12 and rotatably support the idler 96 and drive 94 rolls, respectively. One of skill in the art will recognize that other conveyor arrangements may be employed such as an auger conveyor or chain conveyor as known in the art.

Various sensors in the baler 12 can be used by the controller 70 to control the operating cycles of the baler 12 and the movement of the conveyor belts 92 of the conveyor 90. For example, the controller 70 may direct the baler 12 to begin a bale forming cycle and, if the bale size sensor 68 sends a signal that the bale 20 is less than a minimum size, then the controller 70 may run the conveyor belts 92 at a first speed, such as a low speed. If the bale size sensor 68 indicates that the bale 20 is greater than a minimum size but less than a maximum size then the controller 70 may run the conveyor at a second speed, such as a high speed. If the bale size sensor 68 indicates that the bale 20 is greater than a maximum bale size then the controller 70 may stop the conveyor belts 92 and the baler belts 56 and direct the baler 12 to perform wrapping and ejection cycles. When other sensors, such as the tailgate switch 80, indicate that the bale 20 has been ejected from the baler 12, then the controller 70 may begin a new bale forming cycle and restart the baler belts 56 and the conveyor belts 92.

Figure 3:
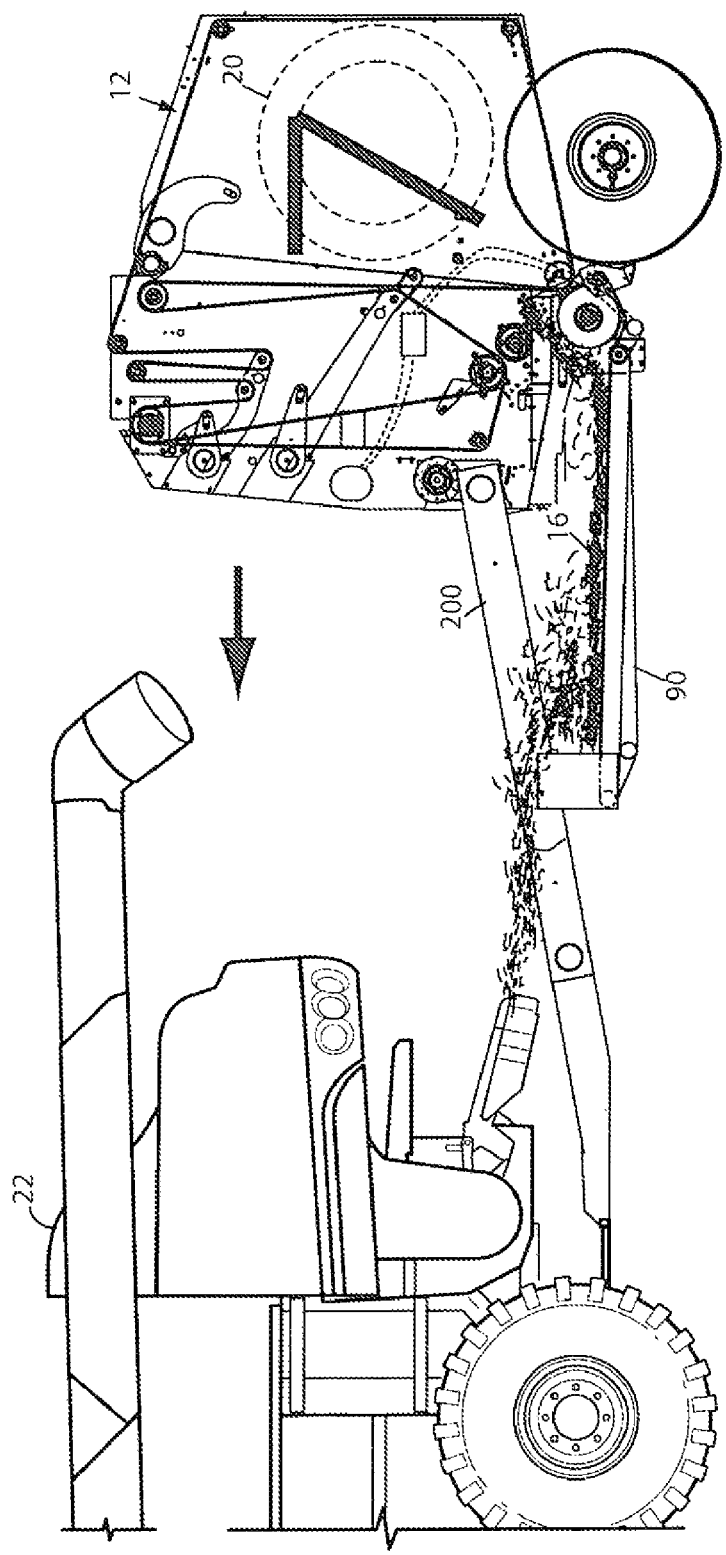
FIG. 3 shows an example embodiment of a continuous baler receiving crop from and being pulled by a combine.

FIG. 3 shows an example embodiment of a continuous round baler 12 being pulled by a combine 22. The combine 22 is coupled to the baler 12 by the tongue 200 and ejects crop material 16 processed by the combine 22 onto the conveyor belts 92. The conveyor 90 conveys the crop material 16 to the baler 12.

Figure 4:
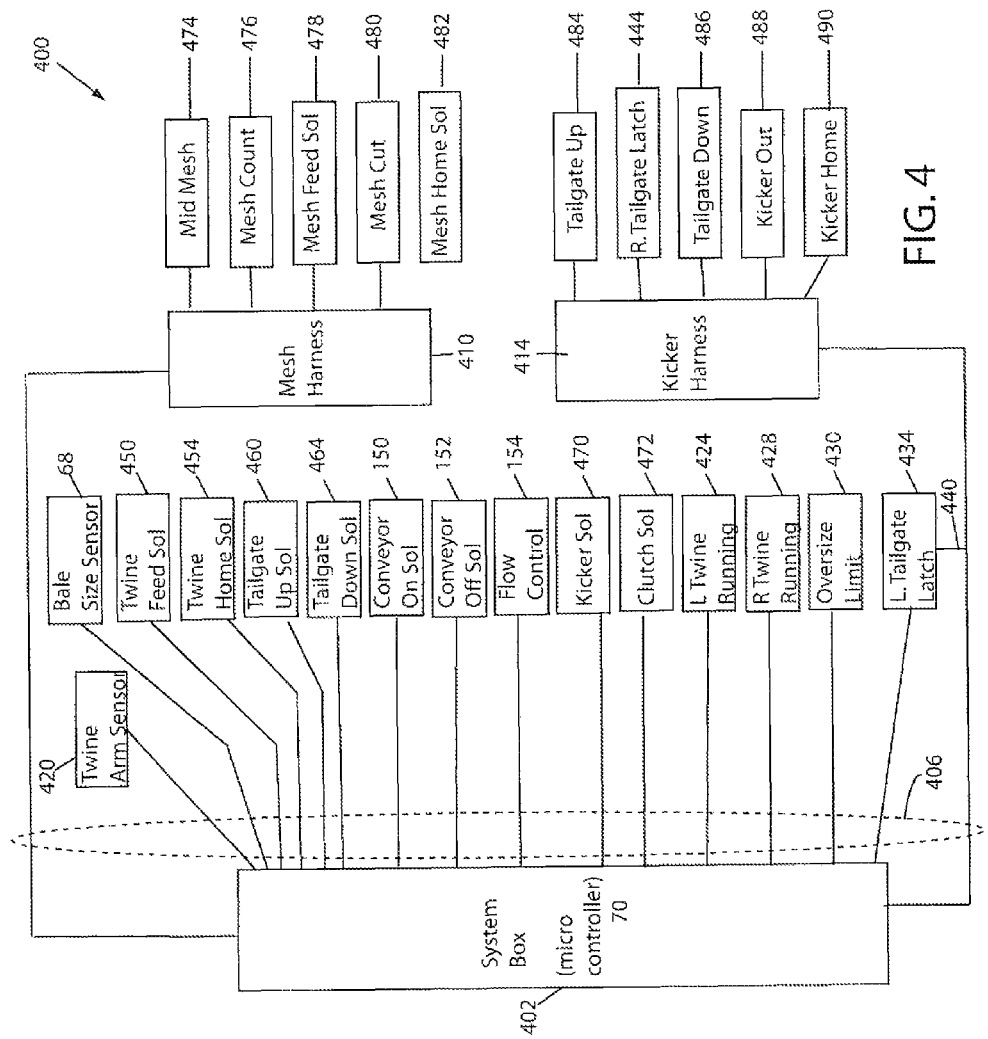
FIG. 4 shows a schematic drawing of an example embodiment of an electronic control system of the continuous baler of FIG. 2.

FIG. 4 is a schematic drawing of an embodiment of an electronic control system 400 of the continuous round baler 12 of FIG. 2. The system 400 of FIG. 4 comprises a system box 402 containing a controller 70 and associated electronic components whose construct will be understood by one of ordinary skill but the details of which are unimportant to the present invention. The arrangement may be comprised of hardware, software, firmware or combination thereof as would be apparent to one of skill in the art. For example, the controller 70 may be a microcontroller capable of receiving data and issue commands for the control of various systems and components in accordance with particular schemes that may be programmed in the microcontroller.

Schematically depicted are three harnesses that connect the system box 402 and controller 70 to elements controlled by the controller that are distributed about the round baler 12 and the conveyor 90. There is a main harness 406, a mesh harness 410, and a kicker harness 414. Although single lines are depicted running from the system box to the various elements, these lines are meant to represent multiple wired connections that run through the harnesses and are connected to the indicated elements.

The main harness 406 connects the system box 402 and controller 70 to different sensors and switches including a twine arm sensor 420, a bale size sensor 68, a left twine running switch 424, a right twine running switch 428, an oversize limit switch 430 and a left tailgate latch switch 434. Bale size sensor 68 sends signals to controller 70 to indicate the size of the bale during the formation cycle. Twine arm sensor 420 sends signals to controller 70 to indicate the location of the twine arm if a twine wrap is being used. Likewise, left and right twine running switches 424, 428 indicate to the controller when the left and right twine rolls are turning and therefore dispensing twine. Oversize limit switch 430 indicates to the controller when the bale has exceeded the trip point for a maximum bale size in the chamber. Left tailgate latch switch 434 indicates whether the left tailgate latch is open or closed. A line 440 is meant to schematically indicate that left tailgate latch switch 434 is actually connected in series with right tailgate latch switch 444 (described below).

The main harness 406 also connects system box 402 and controller 70 to different solenoids and valves that activate the flow of hydraulic fluid to different systems of the baler 12 and the conveyor 90. These may include the twine feed solenoid 450, the twine home solenoid 454, the tailgate up solenoid 460, the tailgate down solenoid 464, the conveyor on solenoid 150, the conveyor off solenoid 152, a flow control valve 154, the kicker solenoid 470, and the clutch solenoid 472 and an auxiliary solenoid (not shown). The twine feed solenoid 450 actuates the twine wrapping mechanism. The twine home solenoid 454 causes the twine arm to return to its home position. Tailgate up solenoid 460 actuates a hydraulic cylinder that lifts the tailgate 58. Tailgate down solenoid 464 causes the same hydraulic cylinder to close the tailgate 58. Kicker solenoid 470 actuates hydraulic cylinders to move the kicker out and back. The clutch solenoid 472 engages and disengages the main drive clutch to establish and suspend the driving connection between the power takeoff shaft of the tractor and various components of the baler 12, such as the stub augers, the starter roll, and the belt drive rolls of the baler. The conveyor on solenoid 150 actuates movement of the conveyor belts 92 of the conveyor 90, the conveyor off solenoid 152 causes the conveyor belts 92 to stop, and the flow control valve 154 regulates the speed of the conveyor belts 92 by controlling the flow of hydraulic fluid to the motor 460. The auxiliary solenoid is available to run optional equipment.

The mesh harness 410 connects the system box 402 and controller 70 to the mid-mesh switch 474, the mesh count switch 476, the mesh feed solenoid 478, the mesh cut switch 480, and the mesh home solenoid 482. The mesh wrapping mechanism is optional and so may or may not appear on any given unit. The mid-mesh switch 474 provides position feedback to controller 70 to stop the mesh dispensing roller in the correct wrapping location. The mesh count switch 476 allows the controller 70 to estimate the amount of mesh usage and indicate the mesh is being applied. The mesh feed solenoid 478 causes the mesh to be fed to the bale chamber during the wrapping cycle. The mesh home solenoid 482 actuates a hydraulic cylinder that returns the mesh wrapping mechanism to its home position at which point a mechanical break over will cut the mesh and close mesh cut switch 480 signaling the end of the meshwrapping process to the controller 70.

Kicker harness 414 connects the system box 402 and controller 70 to different switches including tailgate up switch 484, right tailgate latch switch 444, tailgate down switch 486, kicker out switch 488, and kicker home switch 490. Tailgate up switch 484 signals the controller when the tailgate 58 is in the up position. The right tailgate latch switch 444, wired in series with left tailgate latch switch 434, signals the controller 70 when the tailgate 58 is latched. Because of the series connection between these two switches, no signal is sent unless both are closed. Tailgate down switch 486 signals the controller 70 when the tailgate 58 is in its down position and that the kicker solenoid 470 should deenergize. Kicker out switch 488 signals the controller when the kicker is in its out position and that the tailgate down solenoid 464 should energize. Kicker home switch 490 signals the controller 70 when the kicker is in its home position.

Figure 5:
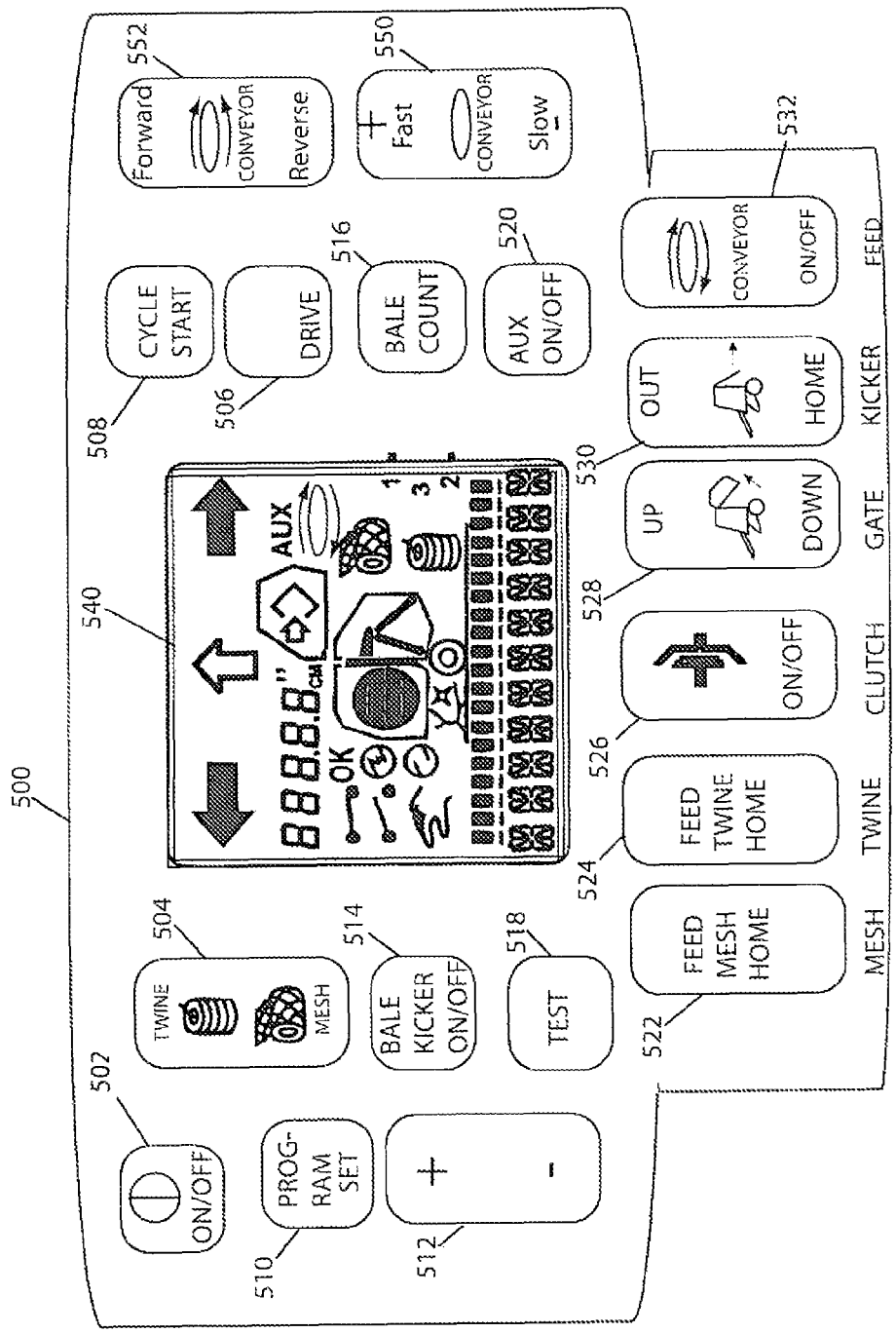
FIG. 5 shows a schematic view of an example embodiment of a control console at a vehicle that is accessible by an operator when towing the round baler of FIG. 2.

FIG. 5 is a plan view of a user interface 500 in the form of a control console 500 provided at an operator's station, such as in the cab of the towing vehicle, such as that of a combine 22 pulling the baler 12 through the field and providing crop material 16 to the baler 12, that is accessible by an operator when operating the round baler 12. The control console 500 may be configured with controls to provide the operator with different levels of control over the baler 12 and adjustable conveyor 14. For example, the operator may be provided with full manual control mode of the round baler, semi-automatic control mode, or automatic control mode. In full manual control mode the operator initiates each major step in the baling process. In the semi-automatic mode, the operator will have less interaction and control fewer tasks. In the full automatic control mode the baler 12 and the adjustable conveyor 14 may operate continuously without additional input from the operator.

The example embodiment of the control console 500 of FIG. 5 includes a power on/off button 502, a twine/mesh select button 504, a drive control button 506, a cycle start button 508, a program set button 510, a value control button 512, a kicker on/off button 514, field/total bale count button 516, test button 518, and auxiliary output on/off button 520. In addition, there are a variety of control buttons including mesh 522, twine 524, clutch 526, gate 528, and kicker 540 and conveyor 542. There is also a central display 540 that indicates baler and conveyor status to the operator during the various baler operational cycles and conveyor modes of operation. In addition to the control console 500, a remote control (not shown) may also be used to handle some control functions including the cycle start function described below.

The controller 70 can have a variety of modes of operation: (1) neutral; (2) test; (3) program; (4) drive; (5) semi-auto; (6) manual, and (7) auto/continuous. The system starts in the neutral mode. At system start up certain checks are performed by the system and the baler and conveyor status is displayed to the operator. From the neutral mode the operator can press the test, set, drive, or any of the mode keys.

The test mode is entered when the operator pushes test key 518. The test mode is used to check the condition of the electrical system components of the baler. This status will be displayed on the console screen 540.

Program mode is entered by depressing set key 510. The operator uses the program mode to set the various settings for controlling baler and conveyor functions. The program mode symbol will illuminate. The setting name and the value will appear on the display screen. To change a value or setting option, the operator can press the appropriate side of value key 512. The set button can be pressed again to advance to the next setting name. Among other values and settings, the baler can be set in automatic mode, also referred to as continuous mode, during the program mode and a bale size conveyor scheme selected.

There are two semi-automatic modes: auto kick and auto wrap. In auto kick mode the baler 12 will form a bale and await a signal prior to wrapping the bale. Once wrapping is signaled, the bale is wrapped and immediately ejected without operator intervention. In auto wrap mode the bale is wrapped automatically after the predetermined bale size is attained and the baler awaits an operator signal before ejecting the wrapped bale. In the automatic or continuous mode, the bale forming, auto kick and auto wrap modes, as well as the movement of the conveyor, may be performed without direct operator intervention. In the continuous mode, the baler 12 may be pulled through the field without stopping and crop material may be continuously provided to the conveyor.

The drive mode is entered by depressing drive key 506. When the drive mode is entered the clutch is engaged and the forming belts 56 of the baler 12 begin to turn and the conveyor motor 120 is powered and the conveyor belts 92 of the conveyor 90 begin to turn. The operator may drive the combine 22 or other vehicle forward pulling the baler 12 behind it and providing crop material 16 to the conveyor belts 92. The operation of the various modes of the baler 12 may be similar to the disclosed in U.S. Pat. No. 6,675,561 entitled "Round Baler Semi-Automatically Sequenced Operating Cycles and Selectively Variable Point of Operator Intervention", which is incorporated by reference herein, and include the bale forming, bale wrapping, and bale ejection modes which may operated semi-automatically with some operator intervention or fully automatically without operator intervention. In either case, the operation of the conveyor 90 may be operated automatically in response to the various modes of the baler 12. For example, the conveyor may be programmed to move in response to the different operational modes of the baler 12, whether the modes of the baler 12 are performed automatically, semi-automatically, or manually. The drive mode key 506 may be depressed whether manual mode, semi-automatic mode, or automatic (continuous) mode will be employed to control the baler operational cycles. In semi-automatic mode, as the baler 12 completes all of the cycles for creating and ejecting a bale 20 it will automatically return to the drive mode for subsequent cycles as further described below. In the automatic (continuous) mode the baler 12 and the conveyor 90 may continuously switch between the various modes until instructed otherwise and so that the baler 12 can be continuously pulled through the field and continuously fed crop material.

The semi-automatic baler mode may be entered by first selecting one of the two modes, auto kick or auto wrap, during the program mode and then depressing the drive key 506 as previously described. The automatic or continuous mode can be entered by selecting the continuous mode during the program mode and then depressing the drive key 506 as previously described. The manual mode can be entered at any time by pressing one of the manual keys. Once in manual mode, the operator controls the forming cycle by controlling the clutch with the clutch button 526, the wrapping cycle by depressing either the mesh button 522 or twine button 524, the ejecting cycle by controlling the tailgate with the gate button 528 and the kicker with the kicker button 530, and the conveyor be pressing the conveyor button 532. In addition to the conveyor on/off button, a conveyor speed button 550 and conveyor direction button 552 may be provided to manually control the speed and direction of the conveyor 90 in when the system is operating in the manual and/or semi-automatic modes. These buttons 550, 552 would send signals to the controller 70 for manipulating the flow control valve 154 and the drive roll 94.

The baler 12 and conveyor 90 may operate as follows. The variable displacement pump 88 within the baler receives energy from the power take-off of the vehicle 22 and pressurizes the system. When the operator signals the beginning of the bale formation cycle by depressing drive key 506, the electronic controller 70 sends a signal to the clutch solenoid 472 which engages the clutch causing the starter roll 26 to turn, and upper and lower drive rolls 24, 28 to turn the forming belts 56, and the feeder 196, and sends a signal to the conveyor on solenoid 150 and flow control valve 154 to power the conveyor motor 120 to drive the conveyor drive roll 94 and move the conveyor belts 92 at a desired speed. The feeder 196 may comprise one or more augers provided with flights that rotate about a common shaft axis and fingers laterally interior of the augers that extend radially from the shaft. Alternatively, stub augers and fingers could be provided on separate rotating shafts. The feeder 196 could be driven from a starting roll drive as known in the art so that the feeder 196 turns when the baler belts 56 are moving. The augers assist in moving crop laterally inward toward the inlet 198 of the baler 12. For example, the conveyor 90 may have a greater width than the inlet 198 of the baler so that the augers narrow the width of the mat of crop material 16 provided by the conveyor 90 to a suitable width for receipt into the inlet 198. The rotating fingers may assist in feeding the crop material 16 into the bale forming chamber 110 of the baler 12.

The operator may move the baler 12 through the field by towing the baler 12 behind a combine 22 which provides crop material 16 to the conveyor belts 92. For example, the combine 22 may be configured to eject crop material 16 from an outlet onto the upper surface 98 of the conveyor belts 92. The conveyor belts 92 move the received crop material to an inlet 198 of the baler 12. The crop material 16 is then fed into the bottom of the open throat bale chamber 198 by an auger 196. Once in bale chamber 198, the crop material contacts the rough top surface of forming belts 56 which are moving upward. The forming belts carry the crop material 16 to the top of the starting chamber which is formed by the front and rear bale density rolls 50, 52. The motion of the forming belts turns the crop material downward against starting roll 26. The core is started and begins to roll. Hydraulic cylinders pull down on the bale density arm 48 and belt tension 30 arms. The bale density rolls 50, 52 are held down to reduce the size of the bale chamber to a starting size. The belt tension rolls 32, 34 are held down to supply tension to the forming belts. As the bale increases in size, the bale density rolls 50, 52 and the belt tension rolls 32, 34 are forced up. The bale density rolls 50, 52 put an increasing amount of downward force against the bale. This force keeps tension on the bale and compresses the crop material coming into the bale chamber. The belt tension rolls move upward to give more forming belt for the increased size of the bale within the chamber.

As the bale size increases and bale density arm 48 moves upward, the bale size sensor 68 continually sends signals to controller 70 indicating bale size. The controller 70 will detect when the bale has reached or exceeded a desired bale size, which may have been originally programmed during the program mode by the operator. The bale size may also be indicated on the console screen 540. If the baler 12 is operating in continuous mode, then when the bale size has reached or exceeded the predetermined bale size, the baler 12 enters the wrapping cycle and the conveyor speed changes in response to the new baler mode. For example, the conveyor 90 may be slowed or stopped during the wrapping cycle as the baler 12 continues through the field and crop material continues to be provided to the conveyor 90 by the combine 22 so that crop material 16 accumulates on the conveyor 90.

In the wrapping cycle the controller 70 may activate either mesh feed solenoid 478 or twine feed solenoid 450 to wrap the bale, depending on the wrap method selected during the program mode. The twine wrap mechanism or mesh wrap mechanism performs its function as will be readily understood by one of ordinary skill in the art. Once the wrap cycle is complete, the clutch solenoid 472 is deactivated by controller 70 to disengage the clutch and stop motion of the forming belts 56. The controller proceeds to the ejecting cycle. The conveyor 90 may remain in the slowed or stopped condition, continuing to accumulate crop material 16 as the baler 12 continues to move through the field during the ejection cycle.

In the ejecting cycle, the controller 70 causes the tailgate 58 to lift by actuating the tailgate up solenoid 460. Once tailgate up switch 484 closes, signaling the position of the tailgate to controller 70, the controller 70 activates the kicker solenoid 470 causing the kicker to push the bale away from the baler. The kicker proceeds outward until in its fully extended or out position, closing kicker out switch 488. The controller then activates the tailgate down solenoid 464 causing the tailgate 58 to move to the down position and closing tailgate down switch 486 which in turn indicates the down position to controller 70. The controller 70 then causes kicker solenoid 470 to deactivate. The tailgate latch switches 434, 444 close, causing the clutch solenoid 472 to energize and forming belts 56 to turn. Deactivation of the kicker solenoid 470 causes the kicker to return home, closing the kicker home switch 490. The baler 12 then immediately begins a new forming cycle as discussed above and the controller 70 restarts the conveyor 90 so that crop material accumulated on the conveyor 90 is provided to the baler 12.

If the operator selects the autowrap semi-automatic mode, the baler will form the bale as described above and, after a short delay, proceed directly to the wrap cycle to wrap the bale without operator intervention. The baler will then await operator intervention comprised of pressing cycle start key 508 or the remote cycle start switch before beginning the ejecting cycle. After receiving operator input, the baler 12 will raise the tailgate 58, unload the bale from the chamber, send the kicker out, lower the tailgate, and send the kicker home, all as previously described. When the tailgate latches 434, 444 are closed, the drive forward arrow will illuminate on display 540. The conveyor 90 can automatically adapt its speed in response to the different modes of the baler 12. Likewise, in a fully automatic (continuous) mode, the baler 12 can move through the various bale forming, wrapping, and ejecting cycles without operator intervention and the conveyor's movement automatically changed in accordance with the different operational cycles of the baler 12. If operating in a non-continuous mode, such as the manual or semi-automatic modes, then the operator can control the movement of the conveyor 90 of the adjustable conveyor 14 by use of the conveyor on/off button 532 the conveyor speed button 550, and the conveyor direction button 552 on the control console 500.

Figure 6:
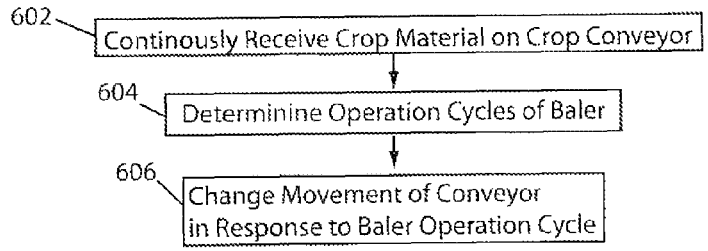
FIG. 6 shows a flow diagram of an example method of a continuous round baler.

FIG. 6 shows an example flow diagram of a continuous baling operation in which the baler 12 can be continuously moved through the field through the various baling operation cycles without stopping and which allows for the continuous gathering of crop material 16 through the various baler operation cycles. At block 602 crop material 16 may be continuously received on the conveyor 90. For example, the crop material may be received on the conveyor through the various operation cycles of the baler 12 and as the baler 12 is pulled through the field. At block 604 the operation cycle of the baler 12 is determined. For example, the controller 70 may receive input from various sensors and switches to determine a desired cycle in which to operate the baler 12 depending upon a variety of factors, such as by way of example and not limitation, the current bale size. At block 606 the conveyor 90 is adjusted in response to the operational cycle determined in block 604. For example, the conveyor may be stopped, sped up, slowed down, reversed, etc., in accordance with the particular operation cycle of the baler 12.

It should be noted that, whereas three particular operation cycles, bale-forming, bale-wrapping, and bale ejection, have been discussed, the term "cycle" is meant to incorporate other existing or future operations that could be performed by a baler and is not limited to the afore-mentioned three cycles. Thus, many other cycles could be performed by the baler 12, and the conveyor 90 adjusted in response to the various cycles. Furthermore, for convenience the term "mode" has been used to describe the movement and operation of the conveyor 90. It should be noted that the conveyor may be manipulated during the various modes to change speed or direction and that while in some example embodiments the conveyor mode corresponds with the operational cycles of the baler, other modes of operation could be employed independently of the baler cycles and the various modes of the conveyor may last for longer or shorter periods than the baler operational modes.

Figure 7:
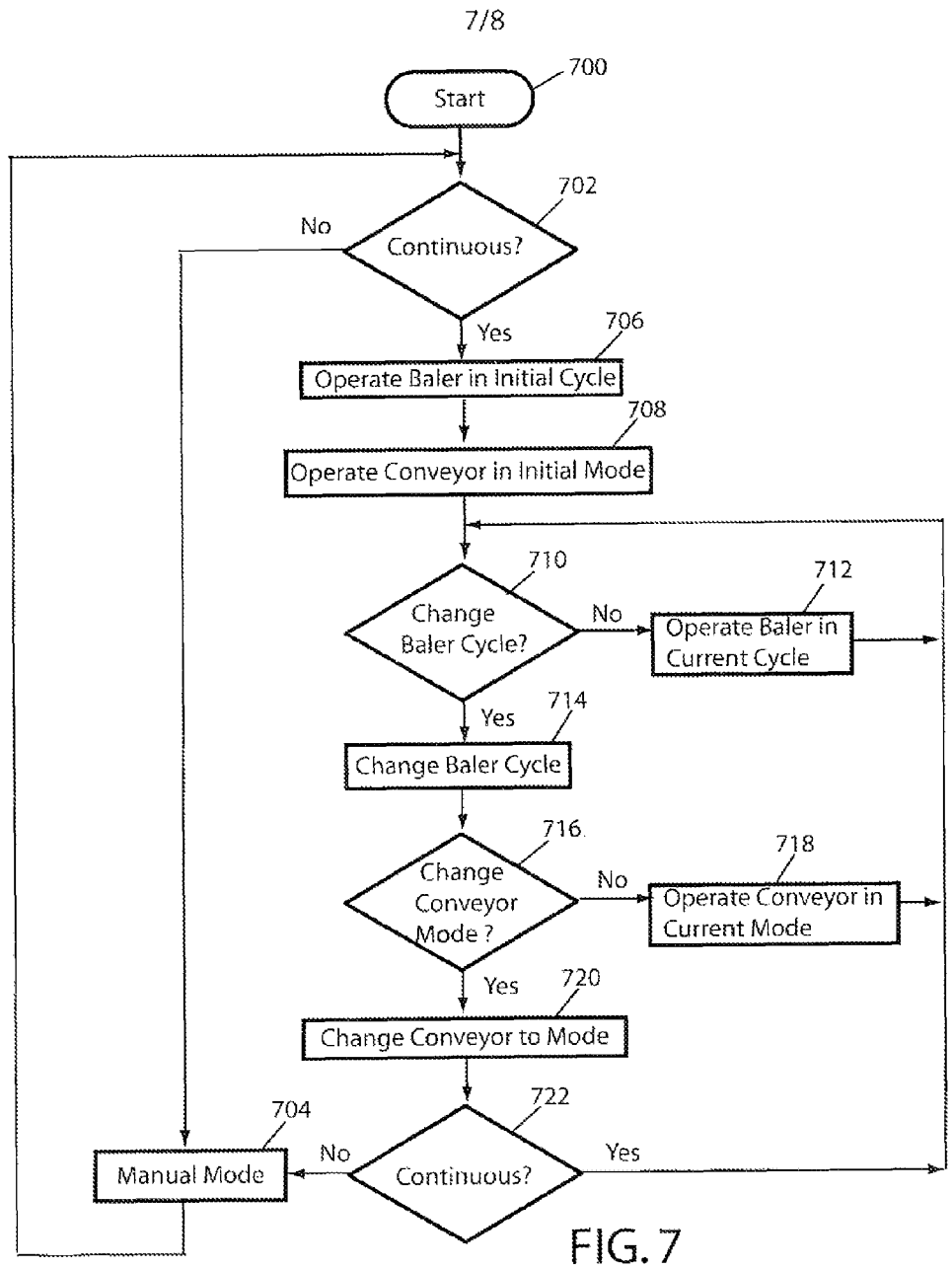
FIG. 7 shows a flow diagram of an example method of a continuous round baler.

FIG. 7 shows a flow diagram of an example embodiment of a method for continuous baling. Once the process is started at block 700 a determination is made at block 702 as to whether the system is operating in continuous mode. If the system is not operating in continuous mode then the system operates in a manual mode or whatever other mode has been selected. For example, an operator may have selected a manual or semiautomatic mode during program set up.

If the baler is in continuous mode then at block 706 the baler operates in an initial cycle. For example, the initial cycle may be the bale forming cycle. The conveyor is then operated in an initial mode at block 708. The initial mode of the conveyor 90 may be a mode desirable for use with the initial cycle of the baler 12. For example, the operational cycle of the baler 12 is the bale forming cycle, then the initial mode of operation of the conveyor 90 may be movement at a first sped to provide crop material to the baler 12.

At block 710 a determination is made as to whether to change cycles of the baler 12. For example, a determination may be made as to whether the baler is ready for a wrap cycle by receiving information that the size of the bale being formed in the baler is greater than a predetermined size. If it is not time to change the baler cycle, then the baler may continue in its present cycle at block 712 and continue doing so until it is deemed appropriate to change the cycle. If such a change is appropriate, then at block 714 the baler changes its operational cycle.

At block 716 a determination is made as to whether to change the mode of the conveyor. For example, under one scheme that may be employed, the conveyor may be programmed to change modes upon a change in the operational cycle of the baler 12. If it is determined that the conveyor mode should not be changed then at block 718 the conveyor continues to operate in its present mode. If it is deemed that the conveyor should change its mode, then at bock 720 the conveyor mode is changed. For example, the conveyor may be stopped, restarted, slowed down, sped up, reversed, etc.

At block 722 a determination is made as to whether the system is still in continuous mode. If not, then at block 704, the conveyor may be switched to manual mode or some other mode. If at block 722 it is determined that the system remains in continuous mode, then a new determination is made at block 710 as to whether to change baler operational cycles. This process may continue to be repeated to allow the baler 12 to change between various operational cycles and the conveyor 90 to change between various modes as the baler continuously moves through the field and crop material is continuously provided to the conveyor 90.

Figure 8:
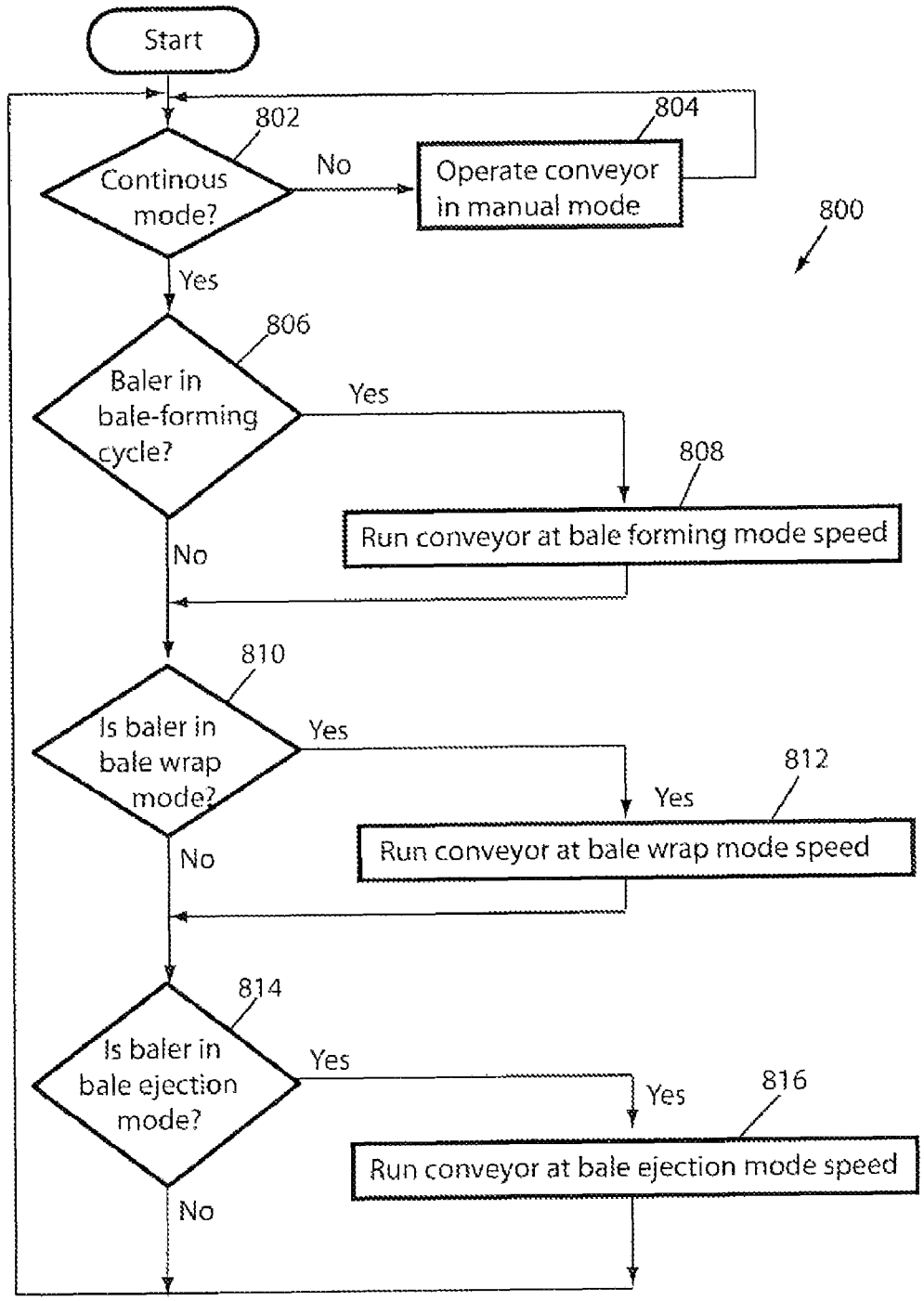
FIG. 8 shows a flow diagram of an example method of an adjustable conveyor for use in conjunction with a continuous baler.

FIG. 8 shows an example method of operating an adjustable conveyor with a continuous baler in which the conveyor is operated in various modes that correspond to the particular operational cycles of the baler 12. At block 802 a determination is made as to whether the baler is in continuous mode. If the baler is not in continuous mode then at block 804 the conveyor 90 is operated in manual mode (or whatever other mode was selected by the operator) until continuous mode is selected. At block 806 a determination is made whether the baler is operating in the bale forming cycle. If so, then at block 808 the conveyor 806 is operated in a corresponding bale-forming mode, i.e., a mode that is desirable when the baler is in bale forming cycle. For example, the conveyor 90 may be run forward at a particular speed in the bale forming mode. If the baler is not in the bale forming cycle at block 806 (or once the conveyor is changed to the bale forming mode at block 808), then at block 810 a determination is made as to whether the baler is in the bale wrap mode.

If the baler is in the bale wrap mode at block 810 than at block 812 the conveyor is operated at a bale wrap mode speed. As discussed above, the speed of the conveyor during the wrapping cycle may be zero, or in other words, the conveyor may be stopped. If the baler is not in the bale wrap mode at block 810 (or once the conveyor has been switched to the bale wrap mode in block 812), then at block 814 a determination is made as to whether the baler is in the ejection mode. If the baler is in the ejection cycle then at block 814 the conveyor is set to an ejection mode in block 816. As previously discussed, the conveyor may remain stopped in the ejection mode. The process then continues back to block 802.

Figure 9:
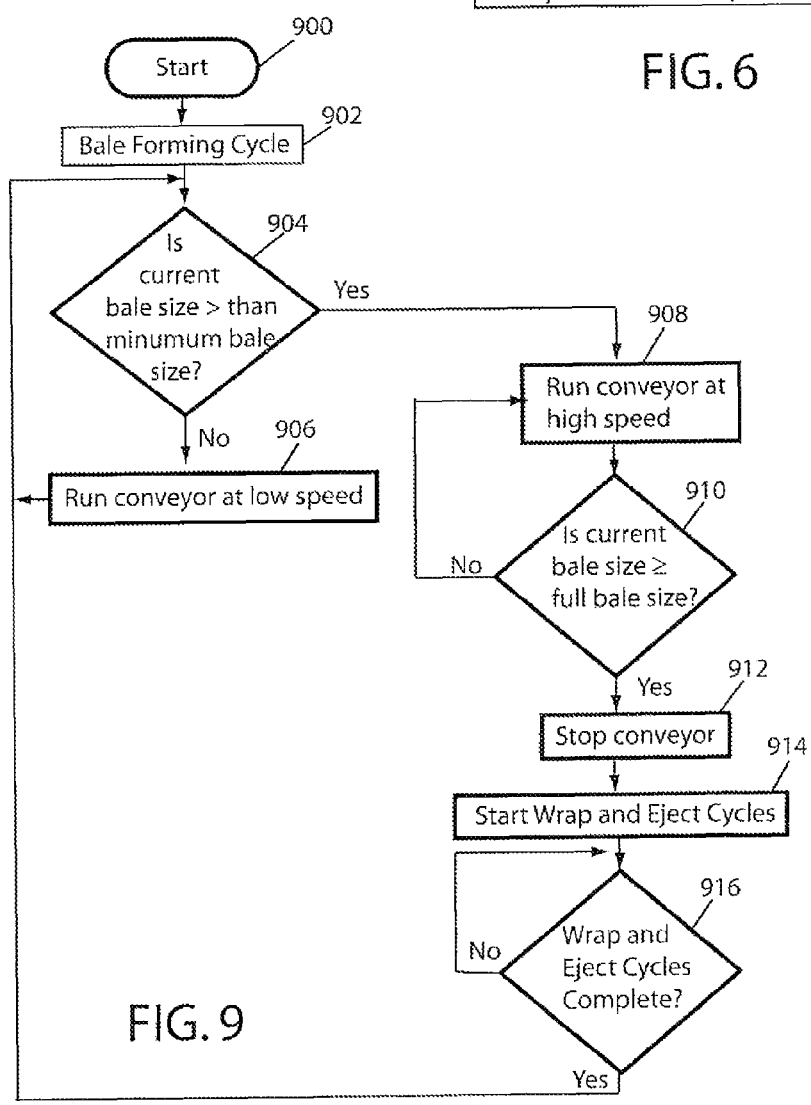
FIG. 9 shows a flow diagram of an example method of a continuous round baler.

In the example flow diagram shown in FIG. 8, the conveyor was set to different modes that correspond to the different operational cycles of the baler 12. FIG. 9 shows an example embodiment of a flow diagram in which the scheme employed for controlling the conveyor 90 includes additional factors. At block 900 the baler is started and at block 902 the baler 12 enters the bale forming cycle. At block 904 a determination is made as to whether the bale 20 is of a size greater than a minimum size. For example, the bale size sensor 68 may be used to determine the size of the bale and transmit it to the controller 70. If the bale is not of sufficient size then at block 906 the conveyor 90 is run at a first speed, such as a low speed. This will allow more crop material 16 to accumulate and limit the amount of crop material 16 entering the bale chamber. The conveyor 90 will remain running at the low speed until it is determined that the bale is of sufficient size at block 904.

If at block 904 the bale 20 is of sufficient size, then at block 908 the conveyor 90 is run at a second speed, such as a high speed. At block 910 a determination is made as to whether the bale 20 is of full bale size. If not, then the conveyor 90 remains running at the second speed. If the bale is of sufficient size at block 910 then the conveyor is set to a third speed, such as stopped, at block 912. At block 914 the wrap and ejection cycles are performed and at block 916 a determination is made as to whether the wrap and ejection cycles are complete. If so, then the process is repeated at block 904 and the conveyor is run at the first speed in block 906.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A continuous round baler, comprising:
   a baler configured to continuously move through a field throughout the baler's operational cycles, the baler configured to form crop material into a bale;
   an accumulation conveyor configured to continuously receive crop material throughout the operational cycles of the baler, the accumulation conveyor configured to convey the crop material to a baling chamber of the baler; and
   a controller configured to manipulate movement of the accumulation conveyor;
   wherein the controller is configured to run the accumulation conveyor at a low feed speed during an initial portion of a bale forming cycle of the baler when the detected bale size is less than a first predetermined size, run the accumulation conveyor at high feed speed when the detected bale size is greater than the first predetermined size but less than a predetermined full bale size, and stop the conveyor when the detected bale size is equal to the predetermined full bale size;
   wherein the accumulation conveyor is configured to continue to receive crop material when stopped.

2. The continuous baler of claim 1, wherein the controller is configured to manipulate the direction of the conveyor flow.

3. The continuous baler of claim 1, wherein the conveyor is configured to receive the crop material from a combine.

4. The continuous baler of claim 1, wherein the crop material comprises material other than grain (MOG).

5. The continuous baler of claim 1, wherein the conveyor comprises at least one conveyor belt configured for receiving crop thereon.

6. The continuous baler of claim 1, wherein the conveyor comprises at least one feed auger configured to convey crop material to the baler.

7. The continuous baler of claim 1, further comprising:
   a user interface configured to allow an operator to select a predetermined scheme for manipulating the conveyor.

8. The continuous baler of claim 1, wherein the conveyor flow is movable in at least two directions.

9. The continuous baler of 7, wherein the conveyor is configured to vary speed and direction of the conveyor flow in accordance with the predetermined scheme.

10. A continuous round baler, comprising:
    a baler configured to form crop material into a bale, the baler having a baler housing;
    an accumulation conveyor extending forward of the baler housing and configured to continuously receive crop material on an accumulation surface forward of the baler housing independent of the operational mode of the baler, the accumulation conveyor configured to convey the crop material to the baler; and
    a controller configured to run the conveyor at a low feed speed during an initial portion of a bale forming cycle of the baler when the detected bale size is less than a first predetermined size, run the conveyor at a high feed speed when the detected bale size is greater than the first predetermined size but less than a predetermined full bale size, and stop the conveyor when the detected bale size is equal to the predetermined full bale size;

wherein the conveyor is configured to accumulate crop material when stopped.

11. The continuous round baler of claim 10, wherein the controller is configured to determine whether the baler is in a bale forming cycle.

12. The continuous round baler of claim 10, wherein the controller is configured to determine whether the baler is in a bale wrapping cycle.

13. The continuous round baler of claim 10, wherein the controller is configured to determine whether the baler is in a bale ejection cycle.

14. A continuous round baler, comprising:
a baler having a baling chamber configured to form crop material into a bale;
a conveyor configured to receive crop material independent of the operational cycle of the baling chamber and convey the crop material to the baler when run in a feed direction and accumulate crop material thereon when stopped;
a sensor to determine a size of a bale forming in a baling chamber of the baler; and
a controller configured to run the conveyor at a low feed speed during an initial portion of a bale forming cycle of the baler when the detected bale size is less than a first predetermined size, run the conveyor at a high feed speed when the detected bale size is greater than the first predetermined size but less than a predetermined full bale size, and stop the conveyor when the detected bale size is equal to the predetermined full bale size, wherein the conveyor continues to receive crop material when stopped.

15. The continuous round baler of claim 14, wherein the controller is configured to manipulate the speed of the conveyor in response to the size of the bale in the baling chamber.

16. The continuous round baler of claim 14, wherein the controller is configured to run the conveyor at low speed until the bale in the bale forming chamber reaches a predetermined size, then run the conveyor at high speed until the bale reaches full size, then stop the conveyor when the bale reaches full size, and run the baler at low speed for the formation of a new bale in the baling chamber.

* * * * *